United States Patent Office 3,518,055
Patented June 30, 1970

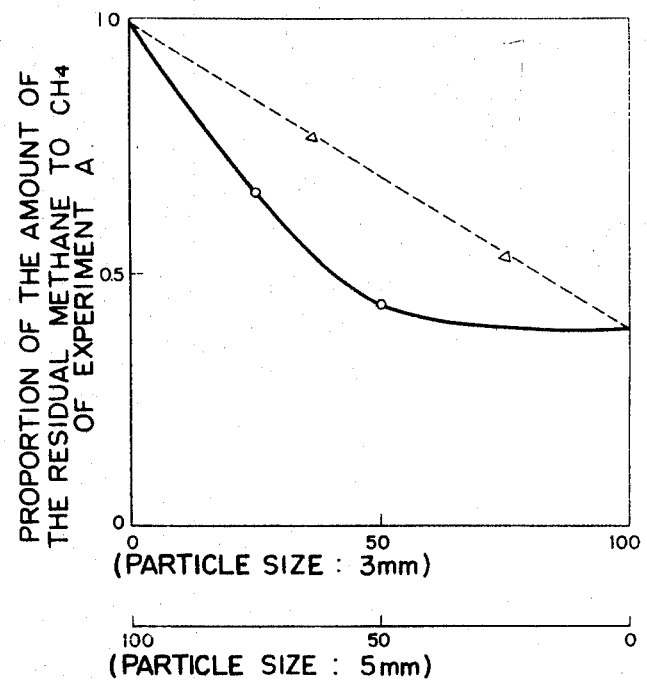

3,518,055
HYDROCARBON REFORMING PROCESS
Shohachi Egashira and Hiroo Matsuoka, Kanagawa, Japan, assignors to Japan Gasoline Co., Ltd., Tokyo, Japan, a corporation of Japan
Filed Mar. 6, 1968, Ser. No. 711,029
Int. Cl. C01b 1/18
U.S. Cl. 23—212                 4 Claims

ABSTRACT OF THE DISCLOSURE

By performing steam reforming of hydrocarbons through a catalyst bed so arranged that the catalyst particles located in the section closer to the outlet of the feed hydrocarbons or the rearward section have a surface area greater than that of the catalyst particles located in the section farther from the outlet or the forward section, the amount of the residual methane contained in the reformed gas will become smaller than the residual methane content resulting from the conventional steam reforming processes.

BACKGROUND OF THE INVENTION

Field of the invention

The present invention is concerned with an improvement in the steam reforming process of hydrocarbons which is conducted through a catalyst bed packed in a reaction tube of the type which is heated externally.

Description of the prior art

When it is intended to manufacture a synthetic gas or hydrogen by carrying out a process of steam reforming of hydrocarbons, it is quite desirable to reduce as much as possible the concentration of the residual methane contained in the reformed gas at the outlet of the reaction tube, from the viewpoint of the economy of the gas refining equipment provided in the stage of operation subsequent to the steam reforming process and also from the aspect of the process which utilizes the reformed gas. For example, in case this reformed gas is utilized as the raw feed gas for the synthesis of methanol, the residual methane container in the reformed gas gives rise to various problems because it is regarded as an inert gas for the synthesis of methanol. More specifically, in the usual methanol synthesis industry, the presence of even a very small amount of such a residual inert gas will cause, in operations which are run with a low concentration of the inert gas, a marked increase in the make-up gas or the recycle gas, and this increase will inevitably necessitate an augmentation of the amount of the driving power. For this reason, it has been required, in such operations, that the residual methane content of the reformed gas be very small.

The steam reforming of hydrocarbons in general are intensive endothermic reactions which eventually increase the number of moles stoichiometrically. Accordingly, these reactions are accompanied by an increase in the amount of the so-called residual methane when the operation is such that it is conducted at a low temperature and under a high pressure. On the other hand, in actual operation, it quite often happens that the reformed gases are placed under a high pressure in the subsequent operations. For this reason, the reformed gases desirably are such in nature that they can be subjected safety to operations conducted under a high a pressure as possible from the economical viewpoint. In view of the fact, however, that an operation which is carried out under a high pressure is accompanied by an increase in the amount of residual methane in the reformed gas, it becomes necessary, in order to obtain a reformed gas composition containing a greatly reduced amount of residual methane, to elevate the reaction temperature with chemical equilibrium, or to elevate the proportion of the steam to the hydrocarbons which are supplied as the raw feed. In the latter case, however, there is naturally a limit on the degree to which the proportion of steam can be elevated when the operation is one which is designed for the production of a gas for oxo synthesis or for methanol synthesis. In industrial operations, therefore, there has been employed the technique of introducing a considerable amount of carbon dioxide into the reaction system to regulate the proportion of carbon monoxide to hydrogen.

As another important technological factor which is closely associated with the amount of residual methane, there is the problem regarding the use of catalyst. In the past, there have been undertaken various researches on the catalysts for use in the steam reforming processes, and as a result, there have been developed catalysts which have a considerably high degree of activity. Owing to the lack of consideration on the catalytic reaction system, however, the ability of the catalysts which in fact are highly active have not been displayed fully when they were used in actual operations. Therefore, with the conventional industrial apparatuses, it is impossible to obtain the desired reformed gas compositions unless the reaction temperature is elevated to a level which is considerably higher than the equilibrium reaction temperature. This inevitably gives rise to a reduction in the lives of not only the reaction tube but also the materials with which the furnace are made or like parts of the apparatuses.

In the process of catalytic steam reforming of hydrocarbons, there proceeds, in general, a marked endothermic reaction in the forward section of the catalyst bed or the section closer to the inlet of the feed material, and accordingly, the operation is accompanied by a sharp drop of the reaction temperature in this forward section of the catalyst bed. For this reason, the effective compensation for this loss of reaction heat constitutes a very important factor for the determination of the efficiency of the process. More specifically, it is known that, in the forward section of the catalyst bed, the heat transfer mechanism—whereby the heat supplied externally of the reaction system reaches the catalyst bed through the walls of the reaction tube and participates in the reaction—mainly serves as the velocity control step of the reaction. Based on this knowledge, there have been conducted various studies on such subjects as the structure of the furnace, the type of the burner, the positional relationship between the reaction zone and the burner, and also on the material of which the reaction tube is manufactured.

SUMMARY OF THE INVENTION

The present invention is based on research on the heat transfer mechanism and the catalytic reaction mechanism in the process of catalytic reforming of hydrocarbons, and aims to reduce as much as possible the amount of the residual methane which is contained in the reformed gas by regulating the surface area of the catalyst particles located in the catalyst bed.

More specifically, it is the aim of the present invention to effect a marked enhancement of the catalytic ability of the catalyst particles used in the steam reforming of hydrocarbons by arranging the catalyst bed in such a way that the catalyst particles located in the rearward section of the catalyst bed or the section farther from the inlet of the feed hydrocarbons in the reaction tube, which tube is heated externally, are of a greater surface area per unit volume of the reaction tube than that of those catalyst particles located in the forward section of the catalyst bed.

The present invention will hereunder be described in further detail. In the process of catalytic steam reforming of hydrocarbons utilizing a reaction bed of the type which is heated externally, the reaction velocity in the forward section of the catalyst bed is governed chiefly by the velocity of the transfer of the heat which is supplied externally of the reaction tube as has been stated above, and in this forward section the effect of the activity per se of the catalyst on the reaction velocity is relatively small. In the rearward section of the catalyst bed, on the other hand, the intensity of the activity of the catalyst is rather directly associated with the composition of the gas produced. The degree of the effect of the activity of the catalyst on the composition of the gas produced increases with the reaction undertaken by those catalyst particles located closer to the rear end of the catalyst bed. Accordingly, it is desirable to keep as high as possible the activity of the catalyst particles located in the rearward section of the catalyst bed.

In general, the activity of the catalyst used in a steam reforming process varies depending on the surface area of the catalyst particles per unit volume of the reaction tube in which they are packed, even when the catalyst particles are made with the same materials and prepared according to the same manufacturing method and are of the same components and composition. The greater their surface area is, the higher their activity will be enhanced. However, the internal surface area of the catalyst particles is not associated with this increase in their activity.

Therefore, in case of a steam reforming of hydrocarbons is carried out in a catalyst bed where the catalyst particles located in the rearward section of the catalyst bed have a greater surface area per unit volume of the reaction tube as compared with those catalyst particles located in the forward section of the catalyst bed, the reaction will be accomplished to an extent higher than that which is attained by a reaction conducted by the use of a catalyst bed wherein the catalyst particles constituting the bed are of a relatively small surface area throughout the entire length of the catalyst bed.

The extent to which a steam reforming reaction is accomplished will be improved somewhat when the reaction is performed with a catalyst bed wherein the surface area of the constituent catalyst particles per unit volume of the reaction tube is relatively large throughout the entire length of the catalyst bed. It is to be noted, however, that the effect of reducing the amount of the residual methane resulting from the use of this latter arrangement of catalyst bed is relatively poor for the largeness of the surface area of the catalyst grains with which the catalyst bed is formed. In addition, there could even arise an increase in the loss of pressure in some operations.

As has been stated previously, the catalyst bed used in the present invention is comprised of two sections, one of which is packed with catalyst particles having a surface area which is different from that of those catalyst particles located in the other of said two sections. The rearward section of this catalyst bed is of a volumetrical proportion which is normally in the range of from 5% to 80% of the entire catalyst bed, preferably from 10% to 60%.

"Increasing the surface area of the catalyst particles" which is referred to in the present invention may be effected by such means as reducing the particles size of the catalyst, or by shaping the particles of the catalyst so as to have an uneven configuration such as columnar, hollow-cylindrical, ring-form and star-shape configurations. By appropriately selecting the particle size and the shape of the catalyst particles as described above, it is possible to arrange the catalyst bed so that those catalyst particles having a greater surface area per unit volume of the reaction tube may be packed in the rearward section of the catalyst bed and that those catalyst particles having a smaller surface area per unit volume of the reaction tube relative to those packed in the rearward section may be located in the forward section of the catalyst bed.

Consideration will next be made with respect to the dissimilar arrangement of the particle size of the catalyst located in the rearward section of the catalyst bed to that of the catalyst packed in the forward section in case this arrangement is applied to an industrial reaction apparatus. The appropriate particle size of the catalyst which is packed in the forward section of the catalyst bed is in the range of from 5 to 20 mm., whereas the appropriate particle size of those for the rearward section is in the range of from 3 to 10 mm. In preparing a catalyst bed, it is necessary to arrange so that the catalyst particles to be packed in the rearward section of the catalyst bed have a particle size which is smaller than that of the catalyst particles which are located in the forward section. As for the configurational relationship between the catalyst particles to be packed in these two sections, it would be appropriate to pack the forward section with catalyst particles having a globular, oblate or columnar configuration, and to pack the rearward section with those having a hollow-cylindrical, ring-form or star-shape configuration. These arrangements, however, are effected by appropriately selecting both the particle size and the configuration of the catalyst particles.

BRIEF DESCRIPTION OF THE DRAWING

The accompanying drawing shows the relationship between the packing ratio of the catalyst particles and the concentration of the residual methane contained in the reformed gas.

DESCRIPTION OF THE PREFERRED EMBODIMENTS

Example 1

Nickel catalysts were prepared with alumina silica carriers and active components carried thereon which consisted of 22% by weight of NiO, 1% by weight of $CrO_3$ and 1% by weight of CuO. These catalyst particles were packed in a single reaction tube in such a way that the pattern with which the catalyst particles packed in one section of the tube was different from that in the other section of the catalyst bed formed. Steam reforming of methane was conducted under the reaction conditions mentioned in Table 1. The result is shown in Table 2. Experiments A and D were performed by the use of tubes each being packed with catalyst particles having a substantially uniform particle size throughout the entire catalyst bed.

Table 1.—Reaction conditions

Reaction temperature: 80° C.
Reaction pressure: 1 atm.
Space velocity: [1] 6200 hr.$^{-1}$
Amount of catalyst packed: 25 gr.
Steam/methane: 3 moles/mole

[1] Space velocity is defined herein as being the total amount, in terms of NTP, of the gas having passed through the catalyst bed, per hour and per unit volume of catalyst.

TABLE 2

| Experiment | A | B | C | D |
|---|---|---|---|---|
| Amount (gr.) of catalyst of 5 mm. in particle size packed in the forward section of catalyst bed | 25.0 | 18.7 | 12.5 | |
| Amount (gr.) of catalyst 3 mm. in particle size packed in the rearward section of catalyst bed | | 6.3 | 12.5 | 25.0 |
| Composition of gas produced (percent by mole): | | | | |
| $CH_4$ | 12.7 | 8.4 | 5.6 | 4.9 |
| $H_2$ | 68.0 | 71.1 | 73.3 | 73.8 |
| CO | 9.4 | 10.8 | 11.2 | 11.7 |
| $CO_2$ | 9.9 | 9.7 | 9.9 | 9.6 |
| Total | 100.0 | 100.0 | 100.0 | 100.0 |

As shown in Table 2, the amount of the residual methane is smaller where the operation is performed with a catalyst bed which is packed, uniformly throughout the entire catalyst bed, with catalyst particles of a small particle size, or in other words, where the surface area of the catalyst per unit volume of the reaction tube is large (refer to Experiment D) as compared with the operation where the vessel is packed, throughout the entire catalyst bed, with catalyst particles having a large particle size, namely, where the surface area of the catalyst per unit volume of the reaction tube is small (refer to Experiment A).

The concentration of the residual methane in Experiment C is reduced to 44% of that of Experiment A, and the concentration in Experiment D is reduced to 39% of that of Experiment A. The percentage of reduction in the methane content, on the other hand, is greater with Experiment D. In contrast to the fact that Experiment D uses catalyst of a small particle size in an amount almost twice that of the Experiment C, however, the reduction in the amount of the residual methane of Experiment D is noted to be disproportionately small.

Example 2

This example shows an instance where the same methane as that used in Example 1 was subjected to steam reforming by the use of catalyst identical with that used in Example 1. In this example, the catalyst bed packed in the reaction tube consisted of a uniform mixture of catalyst particles of both 3 mm. and 5 mm. in diameter. The reaction conditions were identical with those employed in Example 1. The result is shown in Table 3.

TABLE 3.—RESULT OF EXPERIMENT

| Experiment | E | F |
|---|---|---|
| Amount (gr.) of catalyst used: | | |
| 5 mm. in particle size | 16.3 | 6.3 |
| 3 mm. in particle size | 8.7 | 8.7 |
| Total | 25.0 | 25.0 |
| Weightmetric proportion of catalyst having a particle size of 3 mm., percent | 35 | 75 |
| Composition of gas produced (percent by mole): | | |
| $CH_4$ | 9.8 | 7.1 |
| $H_2$ | 72.1 | 74.1 |
| $CO$ | 8.0 | 9.8 |
| $CO_2$ | 10.1 | 9.0 |
| Total | 100.0 | 100.0 |
| Proportion of the amount of residual methane to $CH_4$ of Experiment A | 0.77 | 0.56 |

When the above result is compared with that of Example 1, the superior advantages of the process of the present invention with respect to the amount of the residual methane will be clearly noted.

The accompanying drawing shows the results of Example 1 and Example 2 in terms of relationship between the weightmetric proportion of those catalysts different in particle size packed in the vessel and the proportion of the amount of the residual methane to $CH_4$ of Experiment A. In the drawing, the horizontal axis represents the weightmetric proportion of those catalysts different in particle size, whereas the vertical axis represents the proportion of the amount of residual methane to $CH_4$ of Experiment A. In the drawing, the solid line shows the result of the operation of Example 1 which is conducted according to the process of the present invention, and the broken line represents the result of the operation of Example 2 where the process of the present invention is not employed. From these results, it will be understood that a better result is obtained from the adoption of the process of the present invention as compared with the operation conducted according to the conventional process wherein the catalyst bed consisted of a mixture of catalysts different in particle size. It is also noted from the drawing that there is no substantial difference in the loss of pressure between these two types of operations.

What is claimed is:

1. A process for the catalytic steam reforming of hydrocarbons, which comprises passing a gasiform mixture of hydrocarbon and steam in series through adjacent forward and rearward sections of a catalyst bed in an externally heated reaction zone, each bed section being packed with catalyst particles for the reforming reaction, the catalyst particles in the rearward section have a greater surface area per unit volume of the reaction zone than do the catalyst particles in the forward section, the average particle size of the catalyst particles in the rearward section being less than about 60% of the average particle size of the catalyst particles in the forward section whereby the activity of the catalyst particles in the rearward section is greater than in the forward section in order to minimize the methane content of the reformed gas leaving the rearward catalyst section.

2. A process according to claim 1, wherein the volume of said rearward section of said catalyst bed is in the range of from 5% to 80% of the entire volume of the catalyst bed.

3. A process according to claim 1, wherein the catalyst packed in said forward section of said catalyst bed has a particle size ranging from 5 to 20 mm., and the catalyst packed in said rearward section has a particle size ranging from 3 to 10 mm.

4. A process according to claim 1, wherein said forward section of the catalyst bed is packed with catalyst having a substantially small surface area and having a configuration selected from the group consisting of globular, oblate and columnar configurations, and said rearward section is packed with catalyst having a substantially large surface area and having a configuration selected from the group consisting of hollow-cylindrical, ring-form and star-shape configurations.

References Cited

UNITED STATES PATENTS

| 3,120,431 | 2/1964 | Carton et al. | 23—212 XR |
| 3,132,010 | 5/1964 | Dwyer et al. | 23—212 XR |
| 3,190,730 | 6/1965 | Korwin et al. | 23—212 XR |
| 3,436,358 | 4/1969 | Thygesen | 23—212 XR |
| 3,442,618 | 5/1969 | Sederquist | 23—212 |

FOREIGN PATENTS

| 594,245 | 3/1960 | Canada. |
| 716,505 | 8/1965 | Canada. |

EDWARD STERN, Primary Examiner

U.S. Cl. X.R.

252—373